United States Patent
Hyvärinen

(10) Patent No.: US 12,019,440 B2
(45) Date of Patent: Jun. 25, 2024

(54) CONTROL SYSTEM FOR RECEIVING AN ELEVATOR CALL IN CONJUNCTION WITH A REQUEST FOR AN AUTONOMOUS VEHICLE

(71) Applicant: KONE Corporation, Helsinki (FI)

(72) Inventor: Jaana Hyvärinen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 304 days.

(21) Appl. No.: 17/161,307

(22) Filed: Jan. 28, 2021

(65) Prior Publication Data

US 2021/0149390 A1 May 20, 2021

Related U.S. Application Data

(63) Continuation of application No. PCT/FI2018/050578, filed on Aug. 9, 2018.

(51) Int. Cl.
| | |
|---|---|
| *B60W 60/00* | (2020.01) |
| *B66B 1/24* | (2006.01) |
| *G01C 21/34* | (2006.01) |
| *G05D 1/00* | (2006.01) |
| *G08G 1/00* | (2006.01) |

(52) U.S. Cl.
CPC ......... *G05D 1/0022* (2013.01); *B60W 60/001* (2020.02); *B66B 1/2408* (2013.01); *G01C 21/3438* (2013.01); *G08G 1/202* (2013.01)

(58) Field of Classification Search
CPC .............. B60W 60/001; B66B 1/2408; G01C 21/3438; G05D 2201/0213; G08G 1/202
See application file for complete search history.

(56) References Cited

U.S. PATENT DOCUMENTS

| | | | |
|---|---|---|---|
| 2007/0151809 A1 | 7/2007 | Tyni et al. | |
| 2013/0297093 A1* | 11/2013 | Nowel | B66B 1/468 |
| | | | 700/90 |
| 2014/0339023 A1* | 11/2014 | Friedli | B66B 1/2408 |
| | | | 187/247 |

(Continued)

FOREIGN PATENT DOCUMENTS

| | | | |
|---|---|---|---|
| CN | 1810619 A | 8/2006 | |
| CN | 1976855 A | 6/2007 | |

(Continued)

OTHER PUBLICATIONS

Chinese Office Action for Chinese Application No. 201880096274. 1, dated Feb. 24, 2023, with English translation.

(Continued)

*Primary Examiner* — Jess Whittington
*Assistant Examiner* — Rami Nabih Bedewi
(74) *Attorney, Agent, or Firm* — Birch, Stewart, Kolasch & Birch, LLP

(57) ABSTRACT

According to an aspect, there is provided elevator control system coupled to an autonomous vehicle control system. The elevator control system is configured to receive an elevator call associated with a user; receive an indication of a demand for an autonomous vehicle, the indication being associated with the elevator call; and transmit a request for an autonomous vehicle to an autonomous vehicle control system based on the elevator call and the indication.

6 Claims, 3 Drawing Sheets

(56) References Cited

U.S. PATENT DOCUMENTS

| | | | | |
|---|---|---|---|---|
| 2017/0349402 A1* | 12/2017 | Chapman | ............... | B66B 1/3492 |
| 2017/0351267 A1* | 12/2017 | Mielenz | ..................... | G06T 7/70 |
| 2018/0267541 A1* | 9/2018 | Goldberg | ............... | G08G 1/202 |
| 2020/0049519 A1* | 2/2020 | Yoon | ................ | G08G 1/096811 |

FOREIGN PATENT DOCUMENTS

| | | |
|---|---|---|
| CN | 103974889 A | 8/2014 |
| CN | 104271483 A | 1/2015 |
| CN | 107209518 A | 9/2017 |
| CN | 107705575 A | 2/2018 |
| JP | 2002-68612 A | 3/2002 |
| JP | 2004-331337 A | 11/2004 |
| JP | 2008-162758 A | 7/2008 |
| WO | WO 2008/116963 A1 | 10/2008 |

OTHER PUBLICATIONS

International Search Report for PCT/FI2018/050578 mailed on Apr. 15, 2019.

Written Opinion of the International Searching Authority for PCT/FI2018/050578 mailed on Apr. 15, 2019.

\* cited by examiner

CONTROL SYSTEM FOR RECEIVING AN ELEVATOR CALL IN CONJUNCTION WITH A REQUEST FOR AN AUTONOMOUS VEHICLE

CROSS REFERENCE TO RELATED APPLICATIONS

This application is a Continuation of PCT International Application No. PCT/FI2018/050578, filed on Aug. 9, 2018, all of which is hereby expressly incorporated by reference into the present application.

BACKGROUND

Many people may struggle daily with finding a parking space, spending time walking from a car to the office and back, and waiting for elevators during busy days with strict schedules. These inefficient mobility chains may be frustrating and time consuming for, for example, commuters.

It would be beneficial to alleviate at least some of these drawbacks.

SUMMARY

According to at least some of the aspects, a solution is provided that enables seamless transferring for users between elevators and self-driving cars. Waiting times may be eliminated while user experience is enhanced.

According to a first aspect, there is provided an elevator control system coupled to an autonomous vehicle control system. The elevator control system is configured to receive an elevator call associated with a user; receive an indication of a demand for an autonomous vehicle, the indication being associated with the elevator call; and transmit a request for an autonomous vehicle to the autonomous vehicle control system based on the elevator call and the indication.

In an embodiment, the elevator call associated with a user is received from at least one of a remote elevator call giving device, an elevator signalization panel, a cloud service or a user identification device.

In an embodiment, in addition or alternatively, the indication of the demand for the autonomous vehicle is received from at least one of a remote elevator call giving device, an elevator signalization panel, the cloud service or a user identification device.

In an embodiment, in addition or alternatively, the indication of a demand for an autonomous vehicle comprises at least one of an elevator call to a specific floor, a selection of an autonomous vehicle call button by the user, or the elevator call applied in a predetermined pattern by the user or timing information.

In an embodiment, in addition or alternatively, the request for an autonomous vehicle comprises at least one of elevator destination information, elevator arrival time or user information.

According to a second aspect, there is provided an autonomous vehicle control system coupled to an elevator control system. The autonomous vehicle control system is configured to receive a request for an autonomous vehicle from the elevator control system; and allocate an autonomous vehicle based on the request.

In an embodiment, the request for the autonomous vehicle comprises at least one of elevator destination information, elevator arrival time or user information.

According to a third aspect, there is provided an elevator control system coupled to an autonomous vehicle control system. The elevator control system is configured to receive a request for an elevator car from the autonomous vehicle control system; allocate an elevator car based on the request; and transmit instructions to the autonomous vehicle control system to arrive at a specific location at a specific time.

In an embodiment, the request comprises at least one of schedule information of a user of the autonomous vehicle, user information, estimated arrival time, destination information or a destination floor.

According to a fourth aspect, there is provided an autonomous vehicle control system coupled to an elevator control system. The autonomous vehicle control system is configured to transmit a request for an elevator car to the elevator control system; and receive instructions from the elevator control system to arrive at a specific location at a specific time.

In an embodiment, the request comprises at least one of schedule information of a user of an autonomous vehicle, user information, estimated arrival time, destination information or a destination floor.

In an embodiment, in addition or alternatively, the request for an elevator car is transmitted automatically based on calendar information of the user of the autonomous vehicle synchronized with the autonomous vehicle control system.

According to a fifth aspect, there is provided a method for an elevator control system coupled to an autonomous vehicle control system. The method comprises receiving an elevator call associated with a user; receiving an indication of a demand for an autonomous vehicle, the indication being associated with the elevator call; and transmitting a request for an autonomous vehicle to the autonomous vehicle control system based on the elevator call and the indication.

According to a sixth aspect, there is provided a method for an autonomous vehicle system coupled to an elevator control system. The method comprises receiving a request for an autonomous vehicle from the elevator control system; and controlling an autonomous vehicle based on the request.

According to a seventh aspect, there is provided a method for an elevator control system coupled to an autonomous vehicle control system. The method comprises receiving a request for an elevator car from an autonomous vehicle; allocating an elevator car based on the request; and transmitting instructions to the autonomous vehicle to arrive at a specific location at a specific time.

According to an eighth aspect, there is provided a method for an autonomous vehicle control system coupled to an elevator control system. The method comprises transmitting a request for an elevator car to the elevator control system; and receiving instructions from the elevator control system to arrive at a specific location at a specific time.

According to a ninth aspect, there is provided a computer program comprising program code which, when executed by at least one processing unit, causes the at least one processing unit to perform the method according to any of the fifth to eighth aspects.

According to a tenth aspect, there is provided a computer readable medium comprising program code, which when executed by at least one processing unit, causes the at least one processing unit to perform the method according to any of the fifth to eighth aspects.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1:
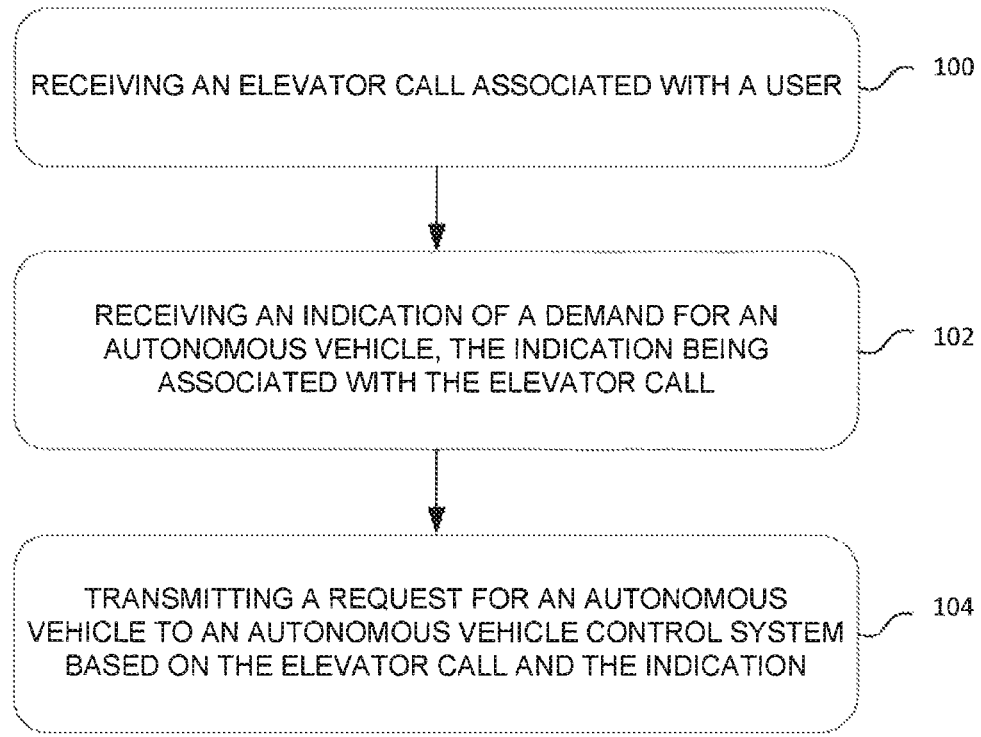
FIG. 1 illustrates a flow diagram of a method for providing a remote autonomous vehicle call by an elevator control system according to an embodiment.

FIG. 1 illustrates a flow diagram of a method for providing a remote autonomous vehicle call by an elevator system according to an embodiment. The elevator control system is connected to an autonomous vehicle control system via a communication network, for example, the Internet.

At step 100, an elevator call associated with a user is received by the elevator control system. The elevator call may be received, for example, from a remote elevator call giving device, an elevator signalization panel, a cloud service or a user identification device. The remote elevator call giving device may be, for example, a mobile phone of the user. The elevator signalization panel may refer to, for example, an elevator car call panel inside an elevator car or a destination panel outside the elevator car, for example, in an elevator lobby. The user identification device may be, for example, a RFID reader located near the elevator.

At step 102, an indication of a demand for an autonomous vehicle is received by the elevator control system, the indication being associated with the elevator call. The indication of the demand for the autonomous vehicle may be received, for example, from the remote elevator call giving device, the elevator signalization panel, the cloud service or the user identification device. In one embodiment, the indication may be received simultaneously with the elevator call. This means that the user made, for example, a special selection when making the elevator call that indicated a need for the autonomous vehicle. In another embodiment, the indication may be received separately or consecutively, meaning, for example, that it may not be received via the same button as the elevator call. The indication of the demand for the autonomous vehicle may comprise at least one of an elevator call to a specific floor, a selection of an autonomous vehicle call button by the user or an elevator call button selection pattern or timing information. The elevator call button selection pattern refers, for example, to a predetermined selection sequence of the elevator call button, for example, one long press or two consecutive presses.

For example, the user may have initiated an elevator call to a garage or an exit lobby, and the elevator call may be considered as an indication that the user is leaving and there is a demand for an autonomous vehicle. As another example, the user may have initiated an elevator call using a remote elevator call giving device, such as a mobile phone. An elevator call application executed in the device may comprise a button for ordering an autonomous vehicle to the elevator. In another example, the demand for an autonomous vehicle may be indicated by giving the elevator call in a predetermined pattern. For example, the demand may be indicated by the user when the user keeps an elevator signalization button pushed for a predetermined time length when giving the elevator call. The pattern may also be, for example, a double press of the elevator call button. The elevator signalization button may refer to a traditional button of an elevator signalization panel, or to a virtual button on a touch-sensitive screen. The timing information may be used as the indication, for example, if the user makes the elevator call, for example, at the end of a business day.

At step 104, a request for an autonomous vehicle to the autonomous vehicle control system is transmitted by the elevator control system based on the elevator call and the indication. The request for the autonomous vehicle may comprise at least one of elevator destination information, elevator arrival time and user information.

For example, the elevator control system may transmit a request for the autonomous vehicle to arrive at an elevator "B" at 10:02 AM. The elevator destination information may also comprise exact coordinates of the elevator. The request may further comprise user information, for example, to verify that the user is an owner of a car the request is transmitted to. In other words, the autonomous vehicle control system may allocate to the user his/her own car.

Alternatively, the autonomous vehicle control system may allocate a car, for example, from a pool of rental or shared vehicles located at a garage of the building or nearby the building. Thus, the request may be transmitted to an autonomous vehicle control system of a user-specific vehicle or to an autonomous vehicle control system coordinating multiple autonomous vehicles.

Figure 2:
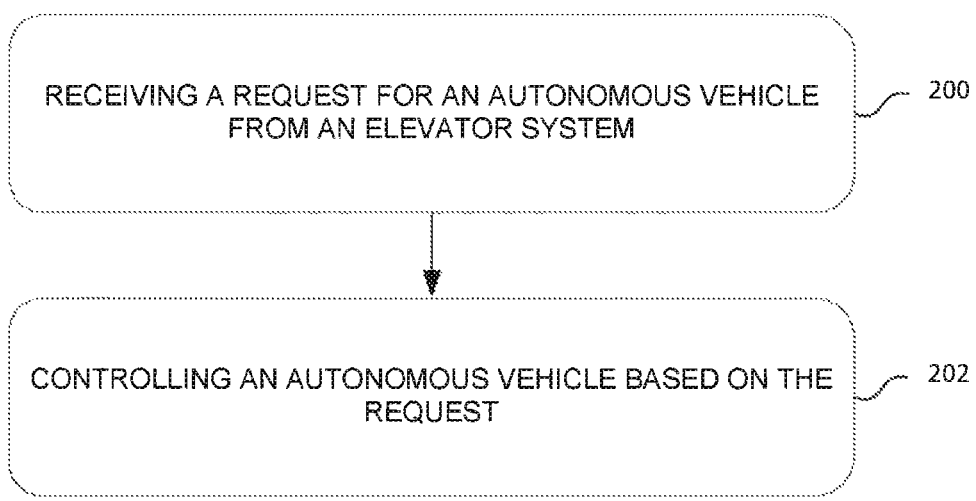
FIG. 2 illustrates a flow diagram of a method for providing a remote autonomous vehicle call by an elevator control system according to another embodiment.

FIG. 2 illustrates a flow diagram of a method for providing a remote autonomous vehicle call by an elevator control system according to another embodiment. The elevator control system is connected to an autonomous vehicle control system via a communication network, for example, the Internet.

At 200, a request for an autonomous vehicle is received from the elevator control system by the autonomous vehicle control system. The request may comprise at least one of elevator destination information, elevator arrival time or user information. The elevator destination information may comprise an exact location of an elevator that the user is using. For example, the location may be provided as geographical coordinates. Alternatively, the elevator control system may request the autonomous vehicle to pick up the user from an elevator "B", if the locations of elevators are pre-stored in the autonomous vehicle control system. The user information may comprise an identity of the user, user preferences and/or billing information associated with the user. Thus, the autonomous vehicle control system may be able to verify that the user has access rights for an autonomous vehicle. The user may be identified as an owner or a holder of a vehicle. Alternatively, the user may be identified to have access to, for example, rental or shared vehicles. The user preferences may comprise, for example, a preferred car type.

At 202, an autonomous vehicle is allocated by the autonomous vehicle control system based on the request. By the time the user has arrived at the destination floor, the allocated vehicle may be ready and waiting at the elevator. Thus, a smooth mobility may be provided for the user as car waiting times are minimized.

In one example, the autonomous vehicle control system coordinates multiple autonomous vehicles. In other words, the autonomous vehicle control system may be configured to allocate and control an autonomous vehicle from a pool of vehicles based on the request from the elevator control system. The autonomous vehicle control system may position autonomous vehicles in one or more parking areas in a specific way. Further, the vehicles in the pool vehicles may be divided into at least two categories. Autonomous vehicles in a first category may be located close to one or more elevators or within a specific moving time from the elevator. This means that, for the autonomous vehicles in the first category, it is possible to arrange them at the elevator within a specified time, for example, 30 seconds after receiving the request from the elevator control system. Autonomous vehicles belonging to a second category may be scattered around the one or more parking areas.

Further, the size of the first category of autonomous vehicles may have a fixed size or a predetermined lower limit. For example, the fixed size may be five vehicles. This means that when an autonomous vehicle belonging to the first category is allocated for a user in response to a request from the elevator control system, the autonomous vehicle control system may automatically initiate a process to complement the first category with a new autonomous vehicle from the second category. In other words, an autonomous vehicle from the second category is moved closer to the elevator. As another example about the predetermined lower limit, when the number of autonomous vehicles in the first category reaches the predetermined lower limit, the autonomous vehicle control system may automatically initiate a process to complement the first category with a new autonomous vehicle or vehicles from the second category so that the number of the autonomous vehicles in the first category reaches a predetermined upper limit. For example, the lower limit may be three autonomous vehicles and the upper limit may be six autonomous vehicles. This means that as soon as the autonomous vehicle control system notices that the number of autonomous vehicles in the first category has decreased to three, the autonomous vehicle control system complements the first category with three new autonomous vehicles from the second category. The use of different categories enables fast response times to the requests received from the elevator control system.

Figure 3:
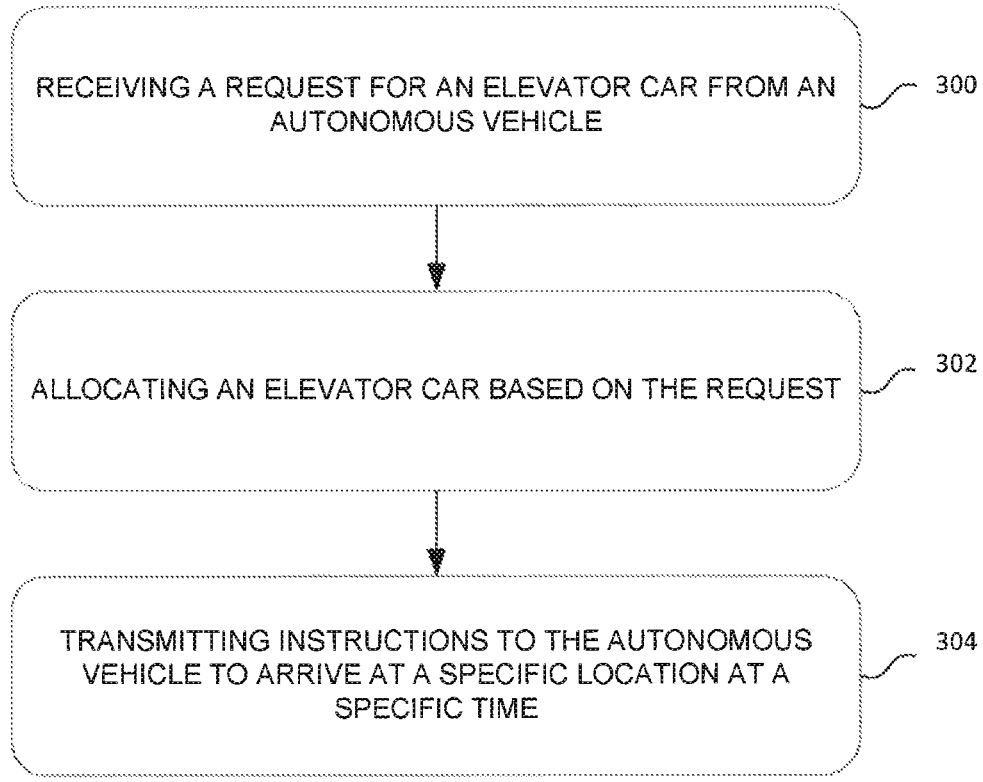
FIG. 3 illustrates a flow diagram of a method for allocating an elevator car according to an embodiment.

FIG. 3 illustrates a flow diagram of a method for allocating an elevator car according to an embodiment.

At 300, a request for an elevator car is received by an elevator control system from an autonomous vehicle. The request may comprise at least one of schedule information of a user of the autonomous vehicle, user information, an estimated arrival time, destination information or a destination floor of the user.

For example, calendar information of the user may be available for the autonomous vehicle. A control system of the autonomous vehicle may be configured to automatically transmit elevator calls based on a schedule of the user using the calendar information. For example, the calendar may comprise a meeting at 9:00 AM at the office of the user. The control system may then automatically transmit a request for an elevator car for the user to arrive to the meeting timely.

At 302, an elevator car is allocated based on the request by the elevator control system. The elevator control system may further consider passenger flow forecasts and elevator cars in duty. Based on the request, the elevator control system may determine the most suitable arrival location for the autonomous vehicle (for example, the nearest elevator to a meeting point), calculate an estimated travel time of the elevator and determine an arrival time of the elevator to pick up the user. The elevator control system may also allocate an elevator car differently based on the user information. For example, if the user is a visitor in the building, the user may have to enter through a main lobby of the building. On the other hand, if the user is an employee working in the building with full access inside the building, any elevator car may be allocated for the user, for example, in a garage floor or the lobby floor.

At 304, instructions are transmitted by the elevator control system to the autonomous vehicle to arrive at a specific location at a specific time. For example, the elevator control system may transmit instructions to the autonomous vehicle to arrive at a garage floor at 8:53 AM.

Figure 4:
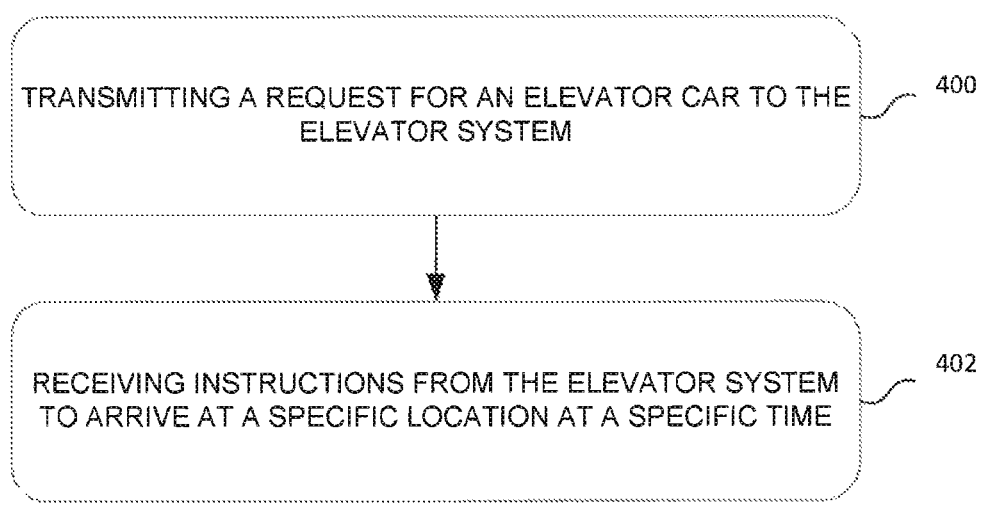
FIG. 4 illustrates a flow diagram of a method for allocating an elevator car according to another embodiment.

FIG. 4 illustrates a flow diagram of a method for allocating an elevator car according to another embodiment.

At 400, a request for an elevator car is transmitted to an elevator control system by an autonomous vehicle control system. The request may comprise at least one of schedule information of a user of the autonomous vehicle, user information, an estimated arrival time, destination information or a destination floor of the user. In an embodiment, the request for an elevator car may be transmitted automatically based on calendar information of a user synchronized with the autonomous vehicle.

At 402, instructions are received from the elevator control system to arrive at a specific location at a specific time. The autonomous vehicle control system may be then able to adjust a driving speed or route of the autonomous vehicle such that it is able to arrive to the elevator in time, and thus, the user does not need to unnecessarily wait by the elevator.

Figure 5:
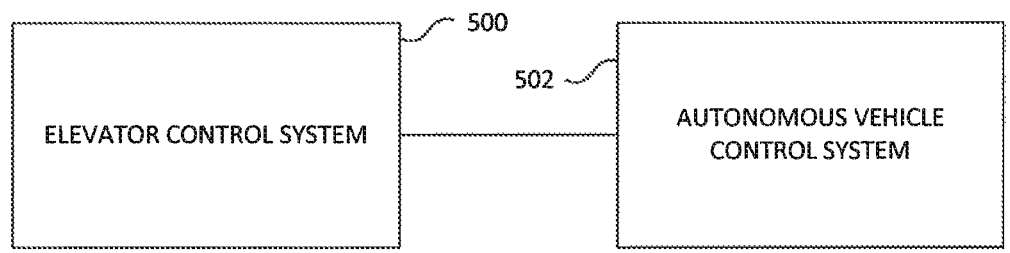
FIG. 5 illustrates a block diagram of an elevator control system coupled to an autonomous vehicle control system according to an embodiment.

FIG. 5 illustrates a block diagram of an elevator control system 500 coupled to an autonomous vehicle control system 502 according to an embodiment.

The elevator control system 500 may be coupled to the autonomous vehicle control system 502 via a communication network, for example, the Internet. The elevator control system 500 may comprise an elevator controller or an elevator group controller configured to control one or more elevator cars and a plurality of elevator call giving devices. The autonomous vehicle control system 502 may be configured to control operations of one or more autonomous vehicles. The elevator control system 500 and the autonomous vehicle control system 502 may be configured to perform any of the methods and other features illustrated in FIGS. 1-4 and in their description.

Figure 6:
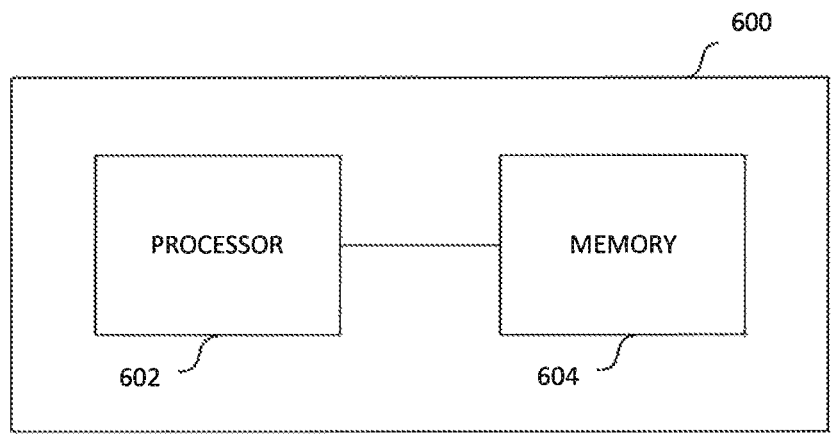
FIG. 6 illustrates an elevator control system according to an embodiment.

FIG. 6 illustrates an elevator control system 600 according to an embodiment.

In an embodiment, the elevator control system 600 may comprise at least one processor 602 and at least one memory 604. The at least one memory 604 is configured to store program instructions which, when executed by the at least one processor 602, causes the elevator control 600 to receive an elevator call associated with a user; receive an indication of a demand for an autonomous vehicle, the indication being associated with the elevator call; and transmit a request for an autonomous vehicle to an autonomous vehicle control system based on the request and the indication.

In another embodiment, the elevator control system 600 may comprise at least one processor 602 and at least one memory 604. The at least one memory 604 is configured to store program instructions which, when executed by the at least one processor 602, causes the elevator control 600 to receive a request for an elevator car from an autonomous vehicle control system; allocate an elevator car based on the request; and transmit instructions to the autonomous vehicle control system to arrive at a specific location at a specific time.

The elevator control system 600 may be configured to perform any of the methods and other features illustrated in FIGS. 1-4 and in their description associated with the elevator control system.

Figure 7:
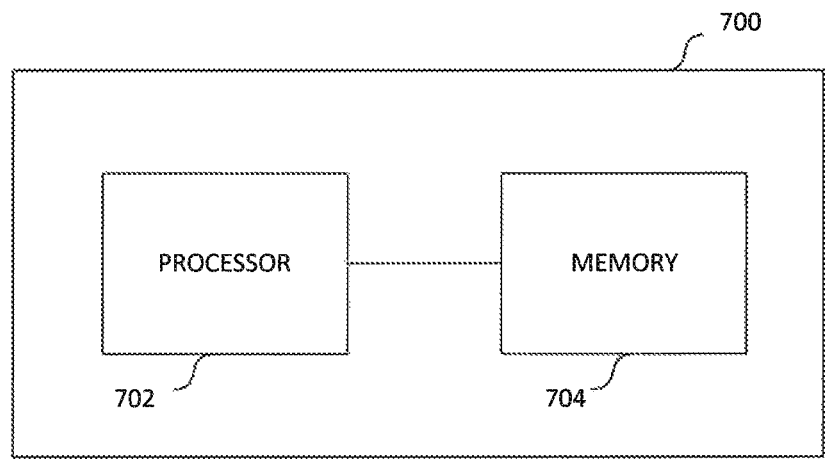
FIG. 7 illustrates an autonomous vehicle control system according to an embodiment.

FIG. 7 illustrates an autonomous vehicle control system 700 according to an embodiment.

In an embodiment, the autonomous vehicle control system 700 comprises at least one processor 702 and at least one memory 704. The at least one memory 704 is configured to store program instructions which, when executed by the at least one processor 702, causes the autonomous vehicle control system 700 to receive a request for an autonomous vehicle from the elevator system; and allocate an autonomous vehicle based on the request.

In another embodiment, the autonomous vehicle control system 700 comprises at least one processor 702 and at least one memory 704. The at least one memory 704 is configured to store program instructions which, when executed by the at least one processor 702, causes the autonomous vehicle control system 700 to transmit a request for an elevator car to the elevator system, and receive instructions from the elevator system to arrive at a specific location at a specific time.

The autonomous vehicle control system 700 may be configured to perform any of the methods and other features illustrated in FIGS. 1-4 and in their description associated with the autonomous vehicle control system.

Throughout the description various embodiments and examples may have discussed that a request, for example, for an elevator car or an autonomous vehicle, may be received "from the elevator system" or "from the autonomous vehicle control system". "From the elevator system" or "from the autonomous vehicle control system" may also mean that a request originates "from the elevator system" or "from the autonomous vehicle control system" and the request may actually be received from another party, for example, a mobile device or a cloud service.

The exemplary embodiments and aspects of the invention can be included within any suitable device, for example, including, servers, workstations, capable of performing the processes of the exemplary embodiments. The exemplary embodiments may also store information relating to various processes described herein.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s).

Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like.

As stated above, the components of the example embodiments may include computer readable medium or memories for holding instructions programmed according to the teachings and for holding data structures, tables, records, and/or other data described herein. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. A system, comprising:
   an autonomous vehicle control system configured to allocate and control an autonomous vehicle from a pool of autonomous vehicles in one or more parking areas, the pool of vehicles being divided into at least two categories including a first category where autonomous vehicles belonging to the first category are located within a predetermined moving time from an elevator, and a second category where autonomous vehicles belonging to the second category are scattered around the one or more parking areas; and
   an elevator control system of said elevator coupled to the autonomous vehicle control system via a communication network, wherein the elevator control system is configured to:
   receive an elevator call associated with a user;
   receive an indication of a demand for the autonomous vehicle, the indication being associated with the elevator call; and
   transmit a request for the autonomous vehicle to the autonomous vehicle control system via the communication network based on the elevator call and the indication,
   wherein the indication of the demand for the autonomous vehicle is received when making the elevator call, and comprises at least one of a selection of an autonomous vehicle call button by the user or the elevator call applied in a predetermined pattern by the user, and
   wherein in response to the indication of the demand from the autonomous vehicle, the autonomous vehicle control system is configured to allocate the autonomous vehicle from the first category, and automatically initiate a process to complement the first category with a new autonomous vehicle from the second category.

2. The system of claim 1, wherein the elevator call associated with a user is received from at least one of a remote elevator call giving device, an elevator signalization panel, a cloud service or a user identification device.

3. The system of claim 2, wherein the indication of the demand for the autonomous vehicle is received from at least one of a remote elevator call giving device, an elevator signalization panel, the cloud service or a user identification device.

4. The system of claim 1, wherein the indication of the demand for the autonomous vehicle is received from at least one of a remote elevator call giving device, an elevator signalization panel, the cloud service or a user identification device.

5. The system of claim 1, wherein the request for an autonomous vehicle comprises at least one of elevator destination information, elevator arrival time or user information.

6. A method for controlling the system according to claim 1, comprising:
   receiving an elevator call associated with a user;
   receiving an indication of a demand for an autonomous vehicle, the indication being associated with the elevator call; and
   transmitting a request for an autonomous vehicle to the autonomous vehicle control system based on the elevator call and the indication.

* * * * *